United States Patent [19]

Yoshikawa

[11] Patent Number: 4,618,072

[45] Date of Patent: Oct. 21, 1986

[54] BILL PAYING MACHINE

[75] Inventor: Eiichi Yoshikawa, Tokyo, Japan

[73] Assignee: Laurel Bank Machine Co., Ltd., Tokyo, Japan

[21] Appl. No.: 644,229

[22] Filed: Aug. 27, 1984

[30] Foreign Application Priority Data

Aug. 30, 1983 [JP] Japan ................................ 58-158504
Aug. 31, 1983 [JP] Japan ................................ 58-159970

[51] Int. Cl.[4] ...................... G07F 11/00; G07F 11/16; B65H 5/22; B65G 57/00

[52] U.S. Cl. ......................................... 221/2; 221/220; 221/252; 221/262; 414/28; 414/43; 271/4; 271/9

[58] Field of Search ................... 221/7, 252, 262, 220, 221/244, 68, 2; 194/DIG. 26; 235/379; 209/534; 271/4, 9, 187, 212; 414/43, 28, 36

[56] References Cited

U.S. PATENT DOCUMENTS 3,655,092 4/1972 Hall et al. ........................ 221/244 X
4,178,119 12/1979 Busch .................................... 414/28
4,343,582 8/1982 Lundblad et al. ................ 414/43 X
4,363,584 12/1982 Kokubo .......................... 271/212 X
4,417,137 11/1983 Lundblad ............................ 235/379
4,439,083 3/1984 Jenkins et al. .................. 271/187 X
4,477,218 10/1984 Bean ........................................ 414/36
4,511,795 4/1985 Wood et al. ......................... 235/379

OTHER PUBLICATIONS

Fujitsu Technical Brochure, "Facom 1506"; Mar., 1983, Fujitsu Limited; Tokyo 100, Japan.

*Primary Examiner*—Joseph J. Rolla
*Assistant Examiner*—Gregory L. Huson
*Attorney, Agent, or Firm*—Fleit, Jacobson, Cohn & Price

[57] ABSTRACT

A bill paying machine of a type to be disposed between two operators and used in common by them. Two paying outlets are arranged side by side on the front portion of the bill paying machine. The bills are transferred from bill containers of the bill paying machine to a position near the paying outlets. In that position, a distributing device is provided for receiving the bills and transferring the bills to one of the paying outlets in response to an instruction by the operator. The distributing device comprises a horizontally movable receiving plate for receiving the bills thereon and directing the bills to one of the paying outlets. Vertically and horizontally movable bill holding plates are provided above the receiving plate for holding the bills between the receiving plate and bill-holding plates.

8 Claims, 12 Drawing Figures

BILL PAYING MACHINE

BACKGROUND OF THE INVENTION

The present invention relates to a bill-paying machine for two over-the-counter operators (tellers), which is disposed over a counter at such premises as a bank between the two operators and is used jointly by both operators.

As a bill-paying machine, there has heretofore been proposed one wherein a single paying outlet for common use by two operators is provided on the front surface, and an instruction means indicating which operator has issued an instruction for paying out the bill is provided on both sides of the paying outlet. In such a conventional bill-paying machine, however, there is a possibility that, when operators are concentrating their attention on serving clients over the counter, the instruction shown by the instruction means may be overlooked, with the result that one operator may receive bills which should be received by the other operator.

SUMMARY OF THE INVENTION

An object of the present invention is to provide a bill-paying machine for two tellers which excells in operational efficiency in taking out bills from the paying outlet. The characteristic of the invention lies in the arrangement of the paying outlet and the structure of a distributing device for distributing accumulated bills into each paying outlet, and a structure wherein a receiving plate where bills are mounted as well as a bill-holding plate for clamping bills between the same and the receiving plate are provided.

According to the present invention, there is provided a bill-paying machine disposed between two operators situated on the right- and left-hand sides and used in common by the two operators, comprising: two paying outlets arranged at the right- and left-hand sides on the front portion of a housing constituting the external surface of said bill-paying machine, and having an opening in each of the right and left directions opposed to each other; a transport device for transporting a predetermined number of bills sent out from bill containers inside said housing on the basis of an instruction for payment issued by each operator; and a distributing device for receiving the bills transported by said transport device and moving the same in the right- and left-hand directions, thereby to pay out the bills to said paying outlets.

BRIEF DESCRIPTION OF THE DRAWINGS

Other objects and advantages of the present invention will become apparent from the following description made with reference to the accompanying drawings, in which.

DESCRIPTION OF THE PREFERRED EMBODIMENT

One embodiment of the invention will be now described in detail with reference to the accompanying drawings.

Figure 1:
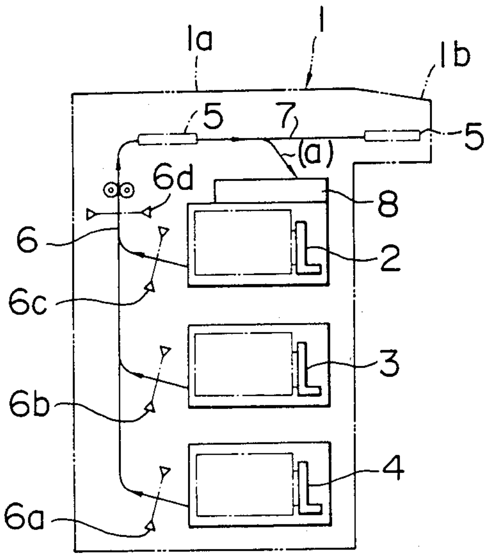
FIG. 1 is a diagram explaining the flow of bills inside a paying machine.
Figure 2:
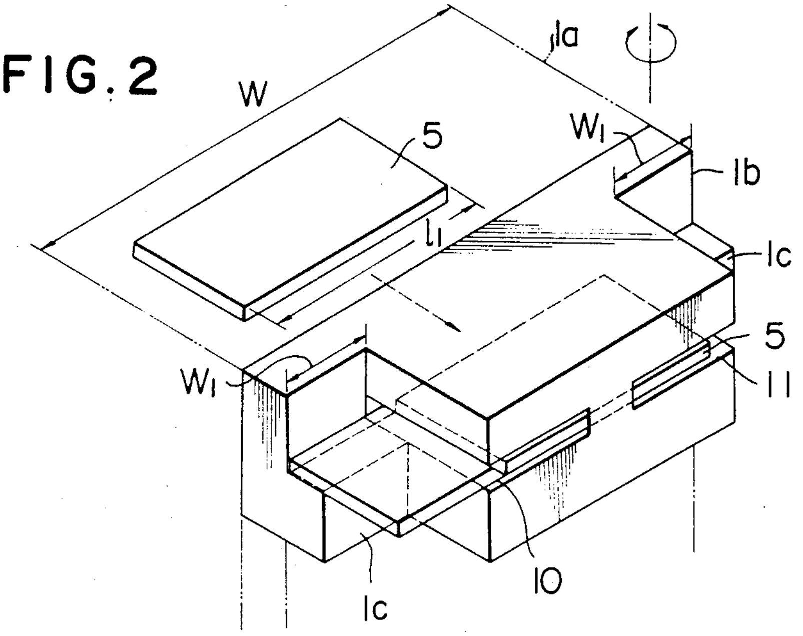
FIG. 2 is a perspective view of a distributing device.

Referring to FIGS. 1 and 2, the reference numeral 1 denotes a housing constituting the outward appearance of the embodiment. The front of this housing 1 is of the door type, and is comprised of a box-like body 1*a* with its front (the right-hand side in FIG. 1) open as well as a front door 1*b* covering the front of the body 1*a*.

As for the body 1*a*, its widthwise dimension W is set to be slightly more than twice the longitudinal dimension $l_1$ of the bill. Bill containers 2, 3, and 4 are mounted in a vertical row at a position closer to the front inside the body 1*a*. The bill containers 2, 3, and 4 are designed to contain bills with their longitudinal dimensions parallel to the widthwise direction of the body 1*a*, and bill-pickup ports are formed at their rear. The bill containers 2, 3, and 4 are so arranged that an open space is left on the ceiling side of the body 1*a* and the centers of the body 1*a* and the widthwise dimension of the bill containers align, and, at the same time, they are secured in such a way that they can be mounted or dismounted with the front door 1*b* open. At the rear of the containers 2, 3, and 4, i.e., at a position closer to the rear inside the body 1*a*, is provided a paying-out device 6 which delivers a required volume of bills from the containers 2, 3, and 4 according to an input signal from a teller's machine (not shown), and feeds the bills consecutively upward to form accumulated bills 5. In addition, a transport device 7 for feeding the accumulated bills 5 forward is provided in the open space between the uppermost container 2 and the ceiling of the body 1*a*. This transport device 7 delivers the accumulated bills 5 along the central line of the width of the body 1*a*. When trouble occurs with the accumulated bills 5, the transport device 7 rejects the bills into a lower reject box (shown by the reference numeral 8 in FIG. 1), as shown by an arrow (a) in FIG. 1, by a signal from detecting devices 6*a* to 6*d*, etc., provided along the feeding route of the paying-out device 6. When there is no trouble, the transport device 7 delivers the accumulated bills 5 to the front door 1*b* by means of a bill-arranging plate 9 shown in FIG. 4.

Figure 3:
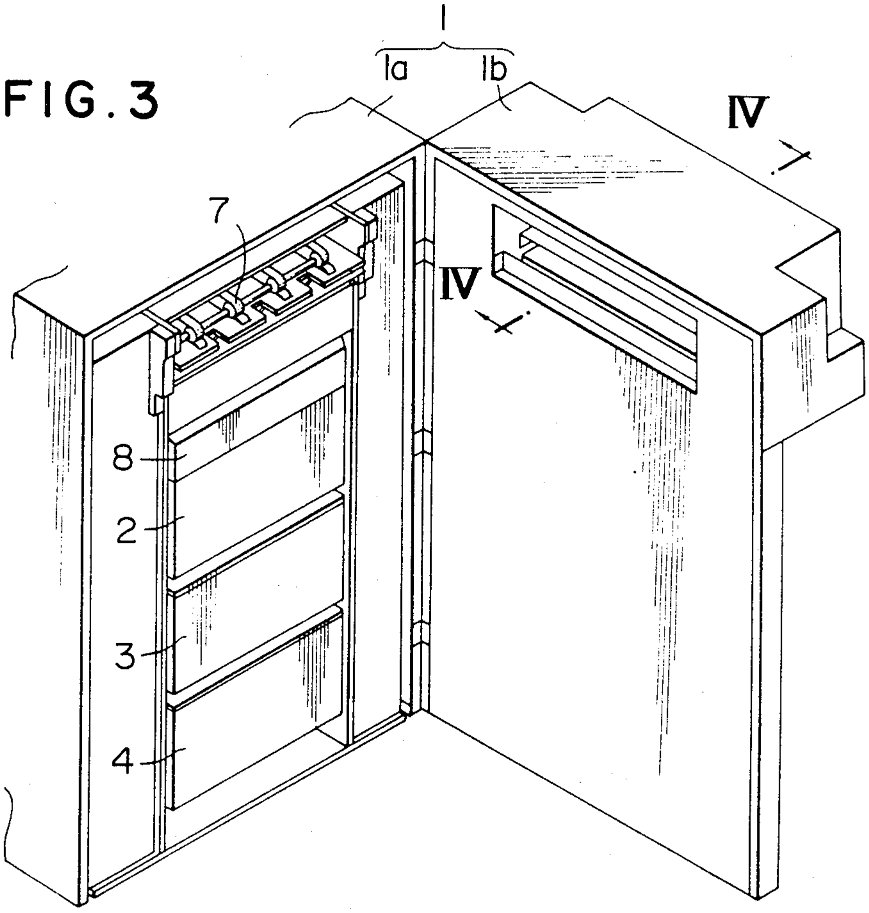
FIG. 3 is a perspective view of a distributing device with the front door open.

The front door 1*b* is formed with its widthwise dimension adjusted to that of the body 1*a*, and is installed openably on the front of the body 1*a* by means of a hinge or the like (See FIG. 3).

A first paying outlet 10 and a second paying outlet 11 are provided in a row on the left- and right-hand sides of the front surface of the front door 1*b*, as shown in FIG. 2. Inside the front door 1*b* is provided the distributing device which receives the accumulated bills 5 fed from the transport device 7 and distributes the bills 5 to the paying outlet from which an instruction for payment has been issued.

The paying outlets 10 and 11 are arranged at the same height appropriately distanced from the upper edge of the front door 1*b*. The height for facilitating handling by over-the-counter operators is also taken into consideration in determining the position. A step 1*c* recessed at an appropriate widthwise dimension $W_1$ is formed at both edges of the paying outlets 10 and 11. This step lc means that the bills that are delivered to the paying outlets 10 and 11 have their corners substantially projected to only the corresponding over-the-counter operator. These corners serve as the portions for grabbing, and hence facilitate the taking out of the bills at the same time as preventing the occurrence of such an accident as that in which an operator receives by mistake the bills which should be taken by the other operator.

Next, description is made of the distributing device with reference to FIGS. 3 to 12.

In other words, the distributing device basically comprises the following: a receiving plate 12 for receiving the bills delivered from the transport device 7 (and the bill-arranging plate 9); bill-holding plates 13*a* and 13*b* for clamping the bills between the same and the receiving plate 12; belts 15 and 16 driven by a motor 14 and horizontally moving the receiving plate 12 and the bill-holding plates 13*a* and 13*b*, respectively; solenoids 17*a* to 17*d* for operating the bill-arranging plate 9, the bill-holding plates 13*a* and 13*b*, etc.; and shutters 18*a* and 18*b* for opening and closing the paying outlets 10 and 11.

Figure 4:
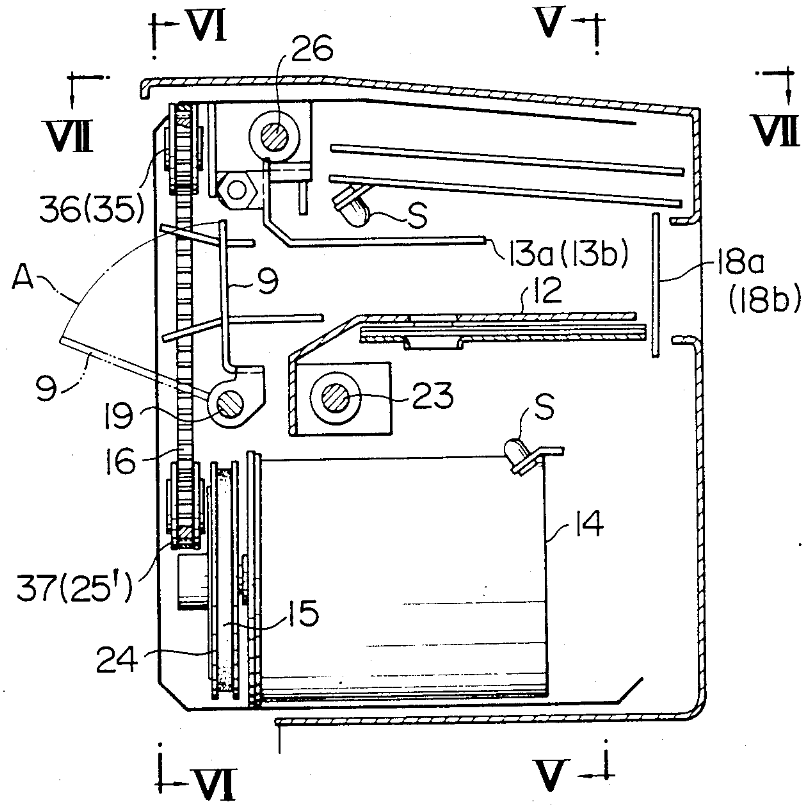
FIG. 4 is a cross-sectional view taken along the line IV—IV from the direction of the arrow in FIG. 3.
Figure 10:
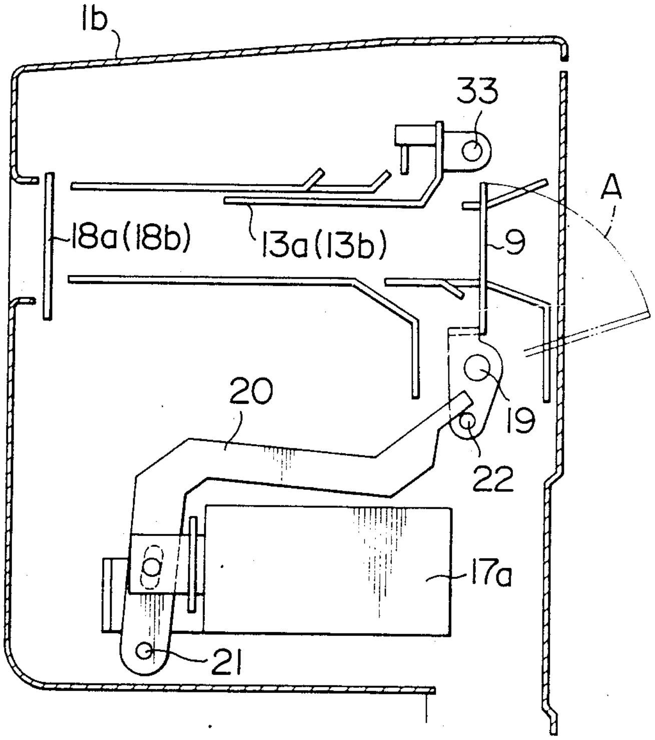
FIG. 10 is a cross-sectional view taken along the line X—X from the direction of the arrow in FIG. 5.

The bill-arranging plate 9 rotates along a locus of rotation, as shown by a chain line in FIGS. 4 and 10, with a shaft 19 as its center. As shown in FIG. 10, the arrangement of the bill-arranging plate 9 is such that it rotates vertically as a link 20 is operated by the solenoid 17*a*, and is capable of being changed over between a retreat posture (shown by a chain line) for receiving the bills from the transport device 7, and a vertical posture (shown by a solid line) for coming into contact with the rear edges of the bills and arranging them. As the link 20 is operated by the solenoid 17*a* and rotates with the shaft 21 as its center, as shown in FIG. 10, the link 20 comes into contact with a pin 22 secured onto the bill-arranging plate 9, thereby to rotate the bill-arranging plate 9.

Figure 5:
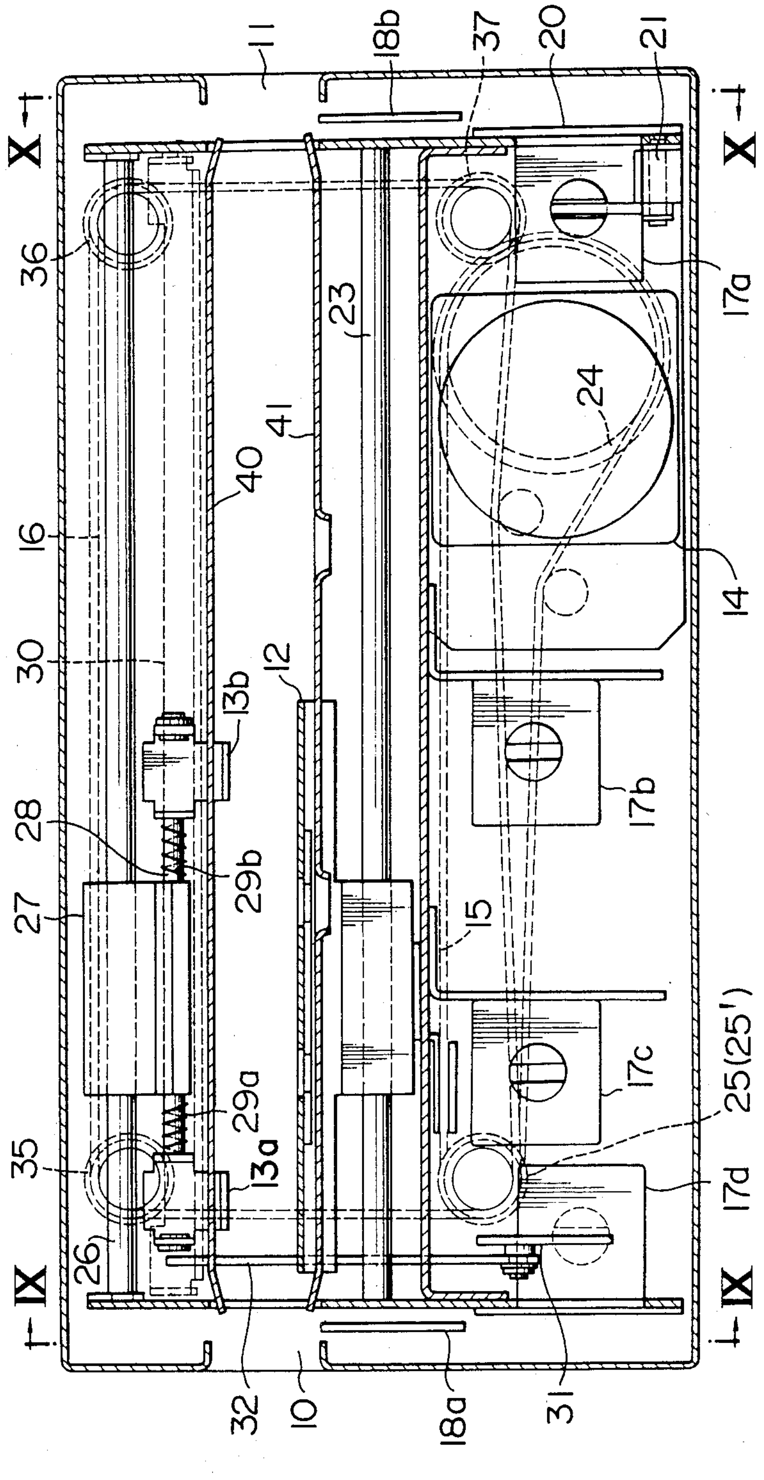
FIG. 5 is a cross-sectional view taken along the line V—V from the direction of the arrow in FIG. 4.
Figure 6:
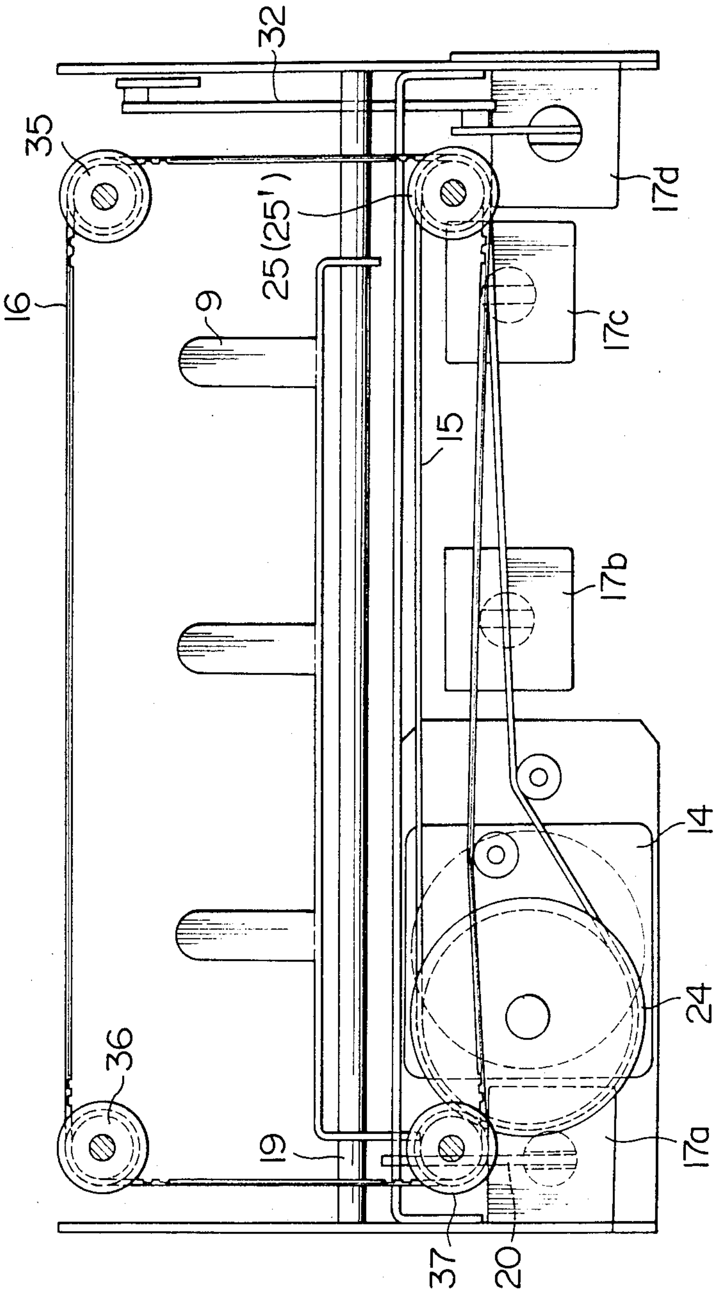
FIG. 6 is a cross-sectional view taken along the line VI—VI from the direction of the arrow in FIG. 4.
Figure 7:
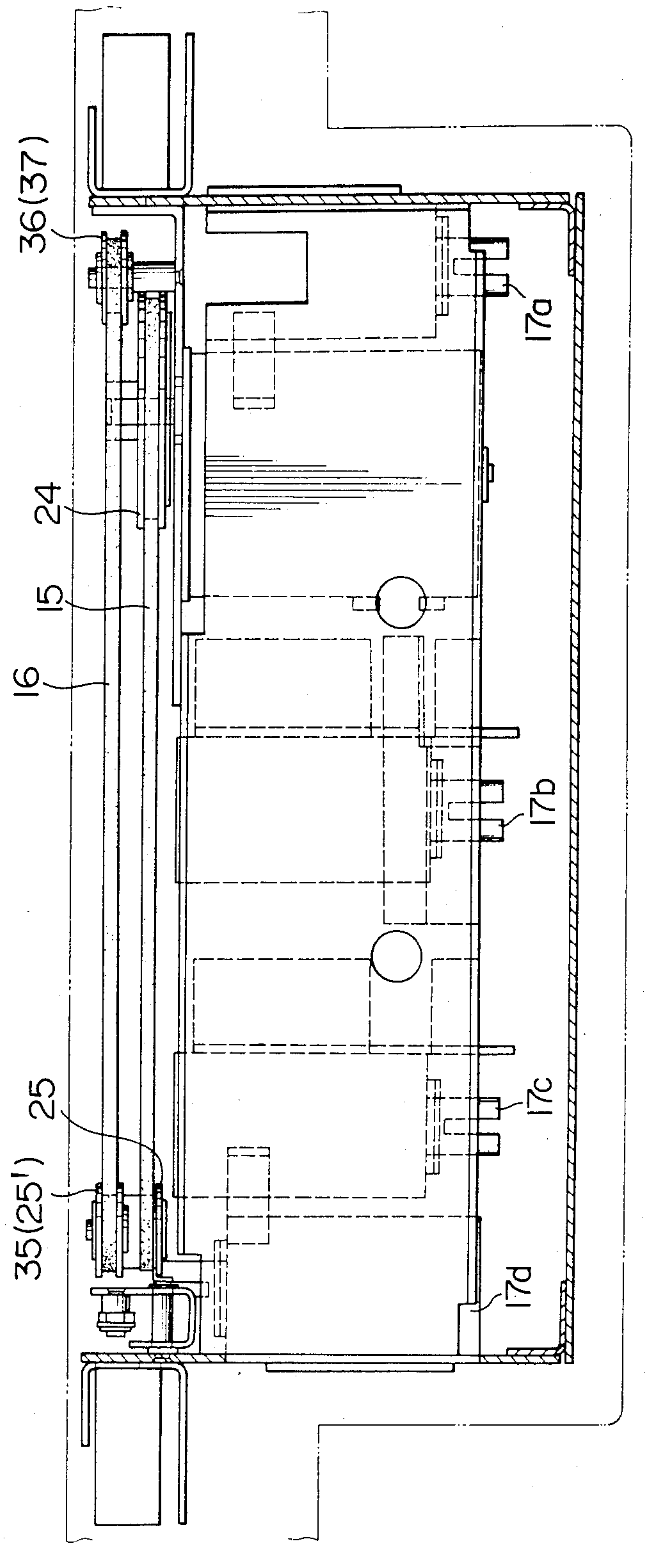
FIG. 7 is a cross-sectional view taken along the line VII—VII from the direction of the arrow in FIG. 4.
Figure 8:
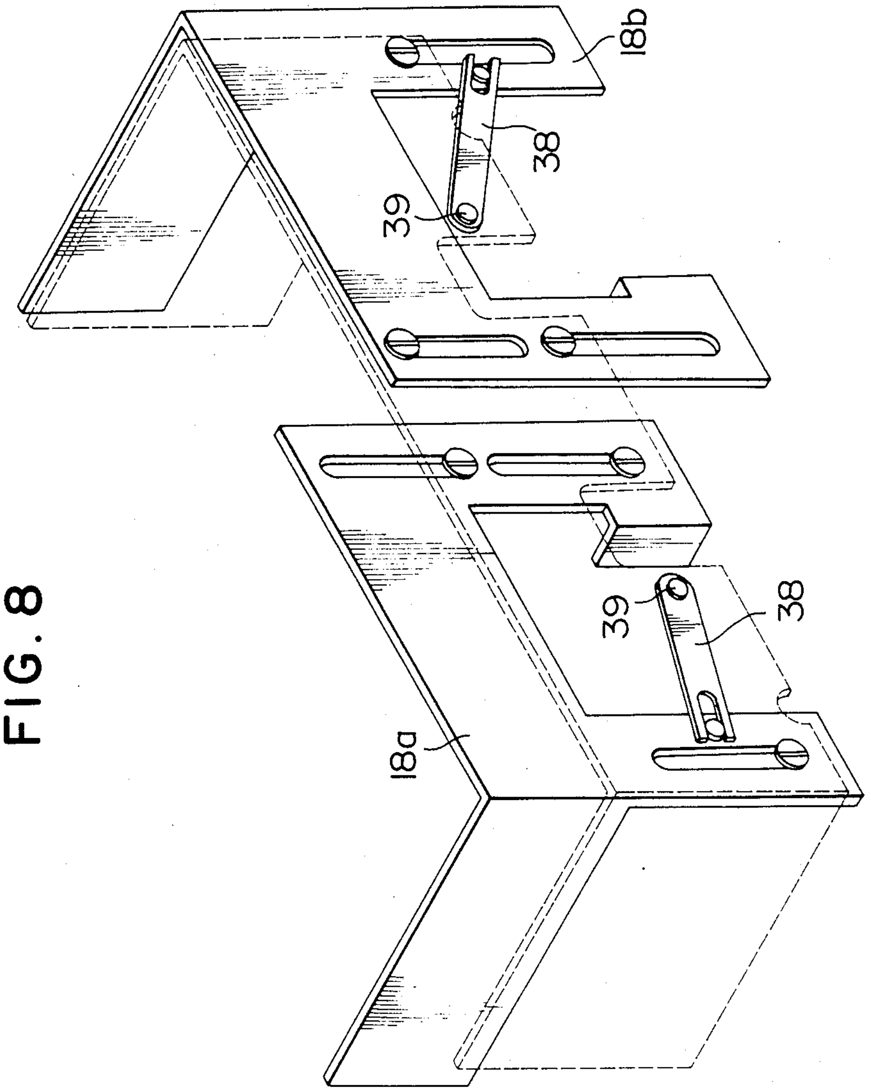
FIG. 8 is a perspective view of the shutter.
Figure 9:
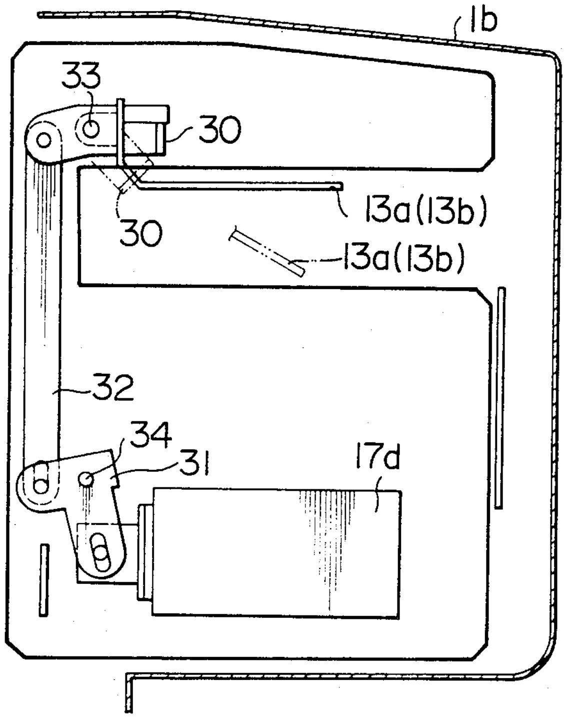
FIG. 9 is a cross-sectional view taken along the line IX—IX from the direction of the arrow in FIG. 5.

The receiving plate 12 has a widthwise dimension slightly smaller than that of the bills, is movably supported in a transverse direction by means of a horizontal frame 23, as shown in FIGS. 4 and 5, and is adapted to be capable of moving horizontally by means of the belt 15 wound around a driving pulley 24 driven by the motor 14 and around a rotatable intermediate pulley 25.

The bill holding plates 13*a* and 13*b* are installed by means of a supporting block 27 axially movably supported by a horizontal frame 26, via a supporting bar 28. The supporting bar 28 supports the bill-holding plates 13*a* and 13*b* vertically and rotatably, respectively. The bill-holding plates 13*a* and 13*b* are respectively urged clockwise as viewed in FIG. 4 by means of torsion springs 29*a* and 29*b*, and are adapted to rotate downwardly by means of the torque of the torsion springs 29*a* and 29*b* and to clamp the bills between the bill-holding plates 13*a* and 13*b* and the vicinity of both ends of the receiving plate 12. Furthermore, the downward rotation of the bill-holding plates 13*a* and 13*b* is restrained by a stop 30 (See FIG. 9). The stop 30 is coupled with the solenoid 17*d* via a link 31 and an arm 32 and is adapted to rotate with a shaft 33 as its center. In brief, when the solenoid 17*d* is actuated, the link 31 rotates with a shaft 34 as its center to push the arm 32 upward, which, in turn, causes the stop 30 to move pivotally downward with the shaft 33 as its center, as shown by a chain line in FIG. 9, thereby allowing the respective bill-holding plates 13*a* and 13*b* to be lowered. Incidentally, the bill-holding plates 13*a* and 13*b* move integrally in the horizontal direction as the supporting block 27 is moved by the belt 16. The belt 16 travels as it is wound around a pulley 25' which is secured by the same shaft as that of the aforementioned intermediate pulley 25 driven by the belt 15 and rotates integrally, as well as around idle pulleys 35 to 37.

The shutters 18*a* and 18*b* are operated by the solenoids 17*b* and 17*c*, respectively, and open or close the paying outlets 10 and 11. The arrangement of shutters 18*a* and 18*b* are such that they move vertically as an arm 38 is rotated with a shaft 39 as its center by transforming the reciprocating movement of the solenoids 17*b* and 17*c* to rotational movement via a link (not shown) and can be changed over to a closing position like the shutter 18*a* or an opening position like the shutter 18*b* (See FIG. 8).

Incidentally, the reference letters S in FIG. 4 denote a sensor, and this sensor S detects the presence of bills on the receiving plate 12 by applying a ray of light onto the bills on the receiving plate 12.

Next, the operation of the bill-paying machine will be described.

(I) This bill-paying machine starts its operation on the condition that either of the two operators, situated on the right- and left-hand sides, issues an instruction for payment, and delivers a specified number of bills sent out from each bill container 2 to 4 by the transport device 7.

(II) The receiving plate 12 is moved for standby to the side opposite an operator (hereinafter called one operator) who issues an instruction for payment. At the same time, the bill-arranging plate 9 is pivotally lowered to the position shown by a chain line in FIGS. 4 and 10. Furthermore, the bill-holding plates 13*a* and 13*b* are pivotally raised to the position shown by a solid line in FIG. 9 by pivotally raising the stop 30.

Figure 11:
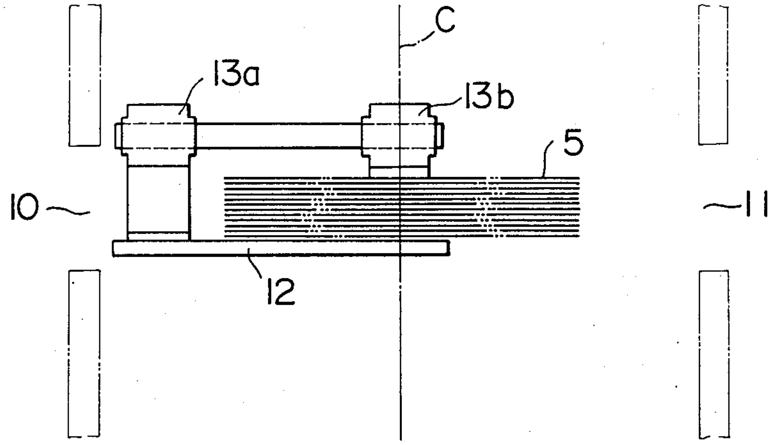
FIGS. 11 and 12 are diagrams explaining the operation of the receiving plate and the bill-holding plate, respectively.

(III) When a specified number of bills are delivered from the transport device without abnormalities, the bill-holding plate 9 is pivotally raised, as shown by the solid line in FIGS. 4 and 10, pays out the bills to the front side of the machine (right-hand side in FIG. 4), delivering the bills 5 on the receiving plate 12. Then, as the bill-arranging plate 9 is brought into contact with the sides of the bills 5, the edges of the bills 5 are arranged between the bill-arranging plate 9 and the shutters 18*a* and 18*b* in the closed state. At this juncture, as shown in FIG. 11, the bills 5 are fed practically into the center between the paying outlets 10 and 11 (this central line is shown by a chain line C), and are mounted on the receiving plate 12 on standby on the other operator's side (i.e., the side of the paying outlet 10) with their right-hand halves protruding therefrom. Incidentally, since the end portions of the bills protruding from the receiving plate 12 are guided by upper and lower guide plates 40 and 41 secured onto the machine between the paying outlets 10 and 11, as shown in FIG. 5, there is no possibility of any occurrence of jamming at the time of paying out.

(IV) When the bills 5 are mounted on the receiving plate 12, the sensor S operates and the solenoid 17*d* is actuated, lowering the stop 30. Then, the bill-holding plates 13*a* and 13*b* are pivotally lowered, urged by the torsion springs 29a and 29b, respectively. However, since the receiving plate 12 is disposed at a position closer to the left-hand side in FIG. 11, the bills 5 are clamped between the right-hand bill-holding plate 13b and the receiving plate 12. Incidentally, the left-hand bill-holding plate 13a is pivotally lowered to come into contact with the receiving plate 12.

Figure 12:
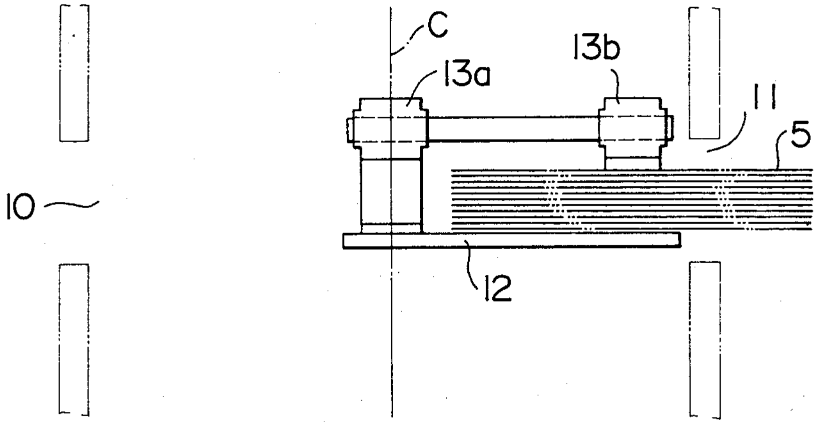

(V) On condition that the bills 5 are clamped and the shutter 18b to which an instruction for payment has been issued is opened, the driving motor 14 is operated, and the receiving plate 12 and the bill-holding plates 13a and 13b are moved horizontally as they are interlinked. Then, as shown in FIG. 12, when the receiving plate 12 moves to the paying outlet 11, the right-hand end portions of the bills 5 are pushed out from the paying outlet 11, i.e., the paying outlet for which an instruction for payment has been issued.

(VI) On condition that the bills 5 have been taken out, the shutter 18b is closed, the stop 30 is raised, and the bill-holding plates 13a and 13b are forcibly raised in a pivotal manner. Additionally, when the bill-holding plate 9 is pivotally lowered, the preparatory state of the next paying operation is ready. Incidentally, when the next instruction for payment is issued by the opposite (the other) operator, the movement of the receiving plate 12 in the aforementioned step (II) is omitted.

Next, description is made of how the function of the distributing device is affected by the relative dimensions of the width $l_1$ of bills, the width $l_2$ of the receiving plate 12, and the mutual distance $W_2$ between paying outlets 10 and 11 ($W_2 = W - 2W_1$).

In other words, according to the aforementioned embodiment, $l_2$ is set slightly larger than $l_1$, and $2l_2$, slightly larger than $W_2$, but it is possible to enlarge the amount of protrusion of the bills from the paying outlet 10 (11) by making $l_2$ smaller, which enlarges the stroke of the receiving plate 12 in the case of a fixed width W'. (However, since the amount of protrusion of bills from the receiving plate then becomes large, it becomes necessary to take into consideration such possible measures as making the holding power of the bill-holding plates greater.) In addition, by making $W_2$ smaller, it is possible to shorten the overall width W of the bill-paying machine and stabilize the bills on the receiving plate 12. (However, the amount of protrusion of the bills from the paying outlet 10 (11) becomes small, resulting in deteriorated efficiency in the withdrawal operation.)

Accordingly, in the aforementioned embodiment, the relative relationship is such that $l_2$ is set slightly smaller than $l_1$, and $2l_2$, slightly larger than $W_2$, by taking into account such factors as the widthwise dimension of the machine, the amount of protrusion of bills from the paying outlet, and the stability of bills on the receiving plate.

In the bill-paying machine described in the aforementioned embodiment, the receiving plate 12 is moved unidirectionally between the two paying outlets, so that it is possible to simplify a positioning-controlling device for determining the stop position of the receiving plate 12, as compared, for instance, with the case of distributing bills into the right- and left-hand sides, by setting the receiving plate 12 on standby in the central portion.

In addition, according to the aforementioned embodiment, since the bill-holding plates 13a and 13b are disposed at positions transversely spaced from the center of the receiving plate 12, when the bills 5 are mounted on the receiving plate 12 at a position closer to the right-hand side, as shown in FIGS. 11 and 12, the right-hand bill-holding plate 13b clamps the bills, and the left-hand bill-holding plate 13a directly comes into contact with the bills. Accordingly, the bill-holding plate 13a serves as a stop restricting the leftward movement of the bills 5 in FIGS. 11 and 12. Hence, this arrangement prevents an accident such as that in which an operator, trying to take out the bills 5 from the paying outlet 11, pushes the bills toward the paying outlet 10 by mistake.

As is apparent from the aforementioned description, the present invention provides a bill-paying machine for common use by two operators situated on the right- and left-hand sides, wherein two bill-paying outlets are provided on the front surface of the machine body, facing the respective operators, bills are mounted on a receiving plate movably installed therebetween, and the bills are distributed to either of the two bill-paying outlets. Hence, the invention produces an effect that, as bills are fed to the operator who has issued an instruction for payment, a mistake concerning which operator should take the bills can be prevented, thereby contributing to the smooth implementation of over-the-counter operations.

In addition, since a plurality of bill-holding plates are movably provided in the direction of contacting the receiving plate and the direction of moving away therefrom, and since the bill-holding plate is urged toward the receiving plate so as to clamp the bills, the invention produces an effect of preventing the occurrence of disorder of the bills at the time when the receiving plate moves, thereby ensuring a sound operation in feeding out bills.

What is claimed is:

1. A bill-paying machine adapted to be positioned between two operator positions situated on the right- and left-hand sides and used in common by two operators, comprising: two paying outlets arranged opposite each other at the right- and left-hand sides on the front portion of a housing constituting the external surface of said bill-paying machine, and having an opening in each of the right and left sides opposed to each other; a transport device for transporting a predetermined number of bills sent out from bill containers inside said housing on the basis of an instruction for payment issued by each operator; and a distributing device for receiving the bills transported by said transport device and moving the same in the right- and left-hand directions to the respective outlet, thereby to pay out the bills through one of said paying outlets, wherein said distributing device includes a receiving plate where bills sent out by said transport device are placed in face to face relationship in a horizontal plane, said receiving plate movable transversely between said paying outlets, holding means cooperable with said receiving plate for releasably holding bills on said receiving plate and movable therewith between said paying outlets, and release means for releasing said holding means.

2. A bill-paying machine according to claim 1, wherein the horizontal spacing between the two paying outlets is smaller than twice the longitudinal dimension of said receiving plate and larger than the longitudinal dimension of the bills, said receiving plate remaining on standby in the vicinity of said paying outlet on the one operator's side on condition that the other operator has issued an instruction for payment, and said receiving plate movable to the paying outlet on the other operator's side on condition that bills have been sent onto said receiving plate.

3. A bill-paying machine according to claim 1, wherein said machine includes shutter means positioned adjacent each paying outing for selectively opening and closing the respective paying outlets.

4. A bill-paying machine according to claim 1, wherein said paying outlets each include first horizontal rectangular openings facing in opposite directions and include second horizontal rectangular openings alongside and connected to said first openings and facing in a horizontal direction transverse to said first openings.

5. A bill-paying machine adapted to be positioned between two operator positions situated on the right- and left-hand sides and used in common by two operators, comprising: two paying outlets arranged at the right- and left-hand sides on the front portion of a housing constituting the external surface of said bill-paying machine, and having an opening in each of the right and left sides opposed to each other; a transport device for transporting a predetermined number of bills sent out from bill containers inside said housing on the basis of an instruction for payment issued by each operator; a receiving plate movably installed in the transverse direction between said paying outlets, receiving the bills from said transport device, and moving to either of said paying outlets; a plurality of bill-holding plates moveably mounted to clamp the bills between the same and said receving plate and also capable of moving in the direction of said receiving plate in an interlocked relation with said receiving plate; a stop for restraining the clamping movement of said plurality of bill-holding plates; a sensor for sensing the presence of the bills on the receiving plate; and means for releasing said stop in response to the sensing of the presence of bills on the receiving plate.

6. A bill-paying machine according to claim 5, wherein said plurality of bill-holding plates are movably supported by supporting blocks and move in an interlocked relation to said receiving plate, in the direction of moving away from said receiving plate and in the direction of approaching the same, respectively, and are urged in the direction of said receiving plate.

7. A bill-paying machine according to claim 6, wherein said plurality of bill-holding plates are initially positioned in a side of the machine opposite to the side where bills will be discharged through the paying outlet.

8. A bill-paying machine according to claim 6, wherein said plurality of bill-holding plates are initially positioned on a side of the machine opposite to the side where an instruction for payment has been issued by an operator.

* * * * *